3,320,866
PHOTOGRAPHIC DIAPHRAGM SHUTTER
Wilhelm Bertram, Sr., Munich-Grafelfing, Germany, assignor to Ernst & Wilhelm Bertram, Munich-Pasing, Germany
Filed June 8, 1965, Ser. No. 462,210
Claims priority, application Germany, June 11, 1964, B 77,207
6 Claims. (Cl. 95—63)

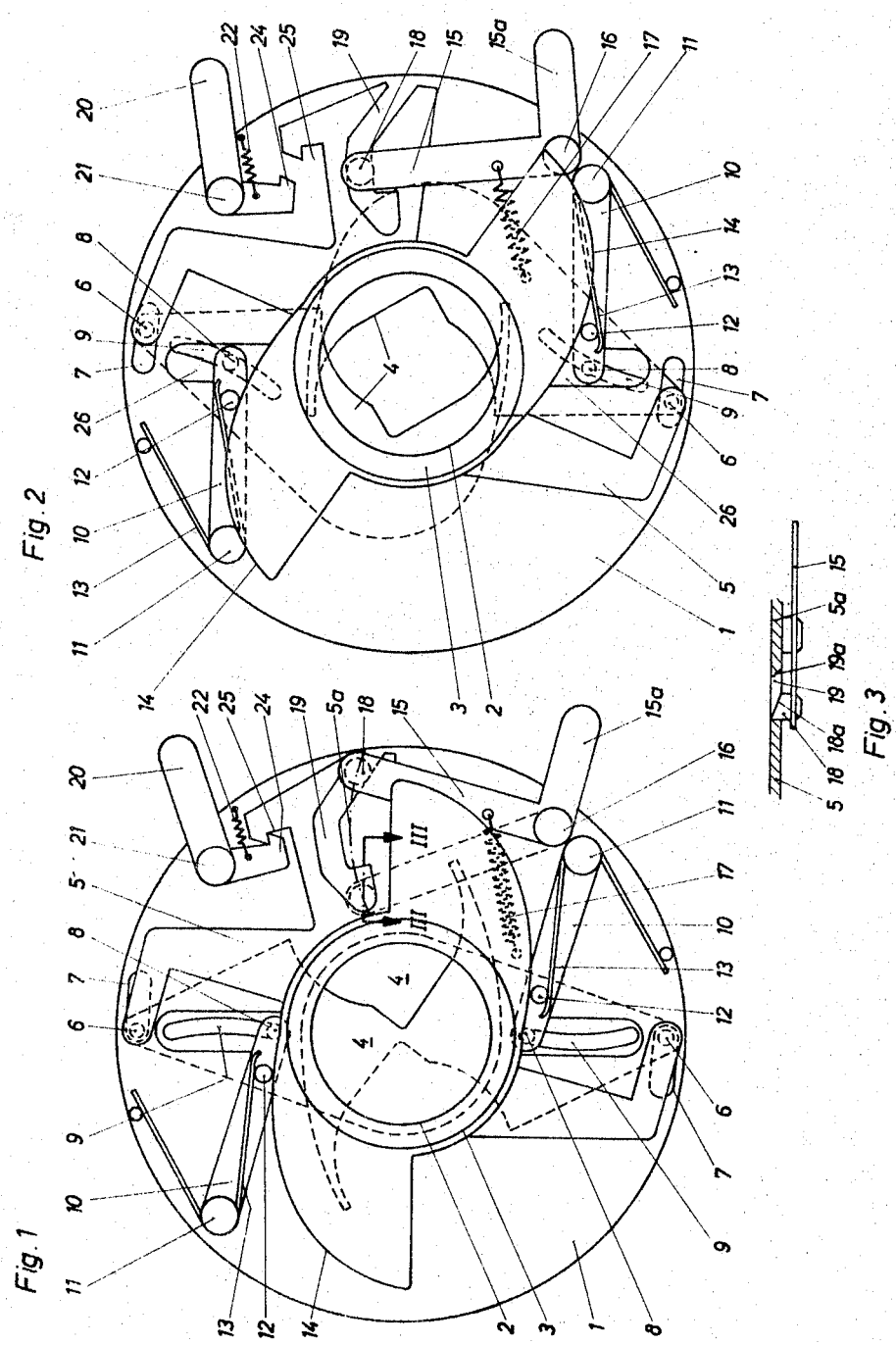

This invention relates to a photographic diaphragm shutter in which the shutter lamellae are caused to move around a pivot pin which is located in spaced relationship to a link pin provided for driving said lamellae. Said driving is effected by suitable apparatus which is in turn driven by an oscillatable drive lever and is connected to the shutter plates by said link pin for effecting the desired opening and closing of same. Adjustment of the spacing between the pivot pin and link pin of each lamella effects adjustment of the width of the opening formed by the lamellae.

In a diaphragm shutter, the shutter lamellae undertake, in addition to their own purposes, which are to cover the aperture of the shutter and release same temporarily for permitting an exposure, the supplemental purpose of functioning as an adjustable iris. This is accomplished by altering the size of the opening of the shutter lamellae so that in each desired adjustment thereof a greater or lesser opening is provided for the passage of light therethrough.

In one known diaphragm shutter of this type, the drive lever is constructed as a rotatable crank driving member to which drive linkage is connected. The drive linkage works through a link pin which is fastened to a pivotally mounted member. This member includes a slot in which a guide pin engages one end of a connecting bar which is linked at its other end to an annularly constructed lamella drive means. The rotating movement of the crank driving member effects a back and forth movement of the drive linkage which is carried by means of the link pin to a pivotally mounted member. This latter receives the guide pin of the connecting bar into a guide slot therein so that the lamellae driving ring carries out an oscillating movement and the shutter lamellae open and close. The mounting of the guide pin in the guide slot of the pivotally mounted member is adjustable through suitable diaphragm adjusting apparatus. A constant swing amplitude of the movably mounted member, as well as the drive linkage, corresponds in this manner to a different adjustable swing amplitude of the lamellae operating ring. Thus, the width of the opening in the shutter lamellae is altered by the adjustment of the guide pin in the guide slot of the pivotally mounted member. In contrast to a shutter in which the adjustment of the width of the opening is not possible so that the link pin can be fastened directly to the lamellae operating ring, two additional components are necessary in the above-described shutter, namely, the pivotally mounted member containing the guide slot and the connecting bar used with the guide pin. In view of the very narrow available space in the housing of the photographic shutter, these additional parts are undesirable. In addition, these extra components increase the manufacturing cost as well as the possibility of operating difficulties.

A further previously known diaphragm shutter is constructed as a self-tensioning shutter. All of the shutter driving parts are mounted on a single base plate. An annularly constructed lamella operating means is arranged on the base plate and is provided with pins which extend through slots therein. A fork cooperates with these pins and comprise the shutter driving means. For opening of the shutter the fork effects a shoving movement in which the pins associated therewith of the lamellae operating ring are carried along and effect an opening of the shutter. Closing of the shutter is obtained by means of a return spring engaging the lamellae operating ring. In order now to alter the width of the opening of the shutter, the base plate is mounted rotatably with respect to all of the shutter driving means mounted thereon in the shutter housing and relative to the lamellae operating ring. In this manner, the length of the drive movement of the fork is altered so that the pins mounted thereon will engage the lamellae moving ring through a more or less greater extent with each respective adjustment of the base plate. In this manner, the amplitude of movement of the lamellae operating ring is changed and thereby the width of opening of the shutter also correspondingly changed. This shutter has the disadvantage that there must be provided a special rotatably mounted base plate for the shutter driving means. Further, the position of the tension-and-release lever projecting out of the shutter housing is different for each respective aperture opening through rotation of the base plate. This is undesirable since such lever should remain in one place, since for the best operation of a hand camera a uniform and constant hand feel for the operator is desirable. Where an automatic adjustment of the aperture is provided, there is the further disadvantage that a sufficient force must be applied by the automatic means to effect rotation of the entire base plate with the drive means of the shutter.

The purpose of the present invention is to provide a diaphragm shutter which is built with extreme simplicity but is reliable in operation. This objective is accomplished, according to the invention, in that for altering of the aperture opening determined by the shutter lamellae the spacing between the pivot pin and the link pin of each shutter lamella is modified through adjustment of one of the two pins in a slot in the lamella by means of suitable adjustment apparatus. In the diaphragm shutter according to the invention, the width of opening provided by the lamellae is controlled by altering the spacing of the two axes around which each lamella rotates in its opening and closing movement. In this manner, it is neither necessary to provide supplemental parts for the driving of the lamellae nor is it necessary to adjustably mount the drive means. For such adjustment it is necessary to move only one pin per lamella. For this purpose, there is required only one adjustment apparatus, which in any case cannot be avoided if the width of the shutter opening is to be adjusted. The shutter according to the invention is therefore very simple in construction, inexpensive in manufacture and reliable in operation. A particular advantage consists in that all drive means, including the lamellae operating means, receive a constant movement in a given aperture adjustment. The amount of movement and moment of inertia of the moving mass is accordingly altered at the respective lamellae. All other parts undergo no change upon adjustment of the aperture opening.

For this purpose, the pivot pin of each shutter lamella is adjustable. This is accomplished by a more simple structure than when the link pin was made adjustable with respect to each lamella since the latter must also be adjusted relative to the lamella operating means. In one particularly simple embodiment of the invention, the pivot pin is connected to each shutter lamella by one pivotally mounted link and is held by a spring force applied to the link in position on a suitable adjustment device, which may include an adjustment cam. The adjustment of the aperture, that is, the shutter opening, is brought about in a simple manner in that the adjustment cam is rotated and the pivot pins mounted thereon are moved against the force of the spring associated therewith. Through corresponding adjustment of the link and the magnitude of the spring force it is possible to carry out this adjustment with a minimum of force applied thereto.

In the presently known shutters in which the shutter lamellae are pivoted by means of an oscillatable shutter drive ring, the pivot pins of the shutter lamellae must be guided in a slot since otherwise a rotation of the shutter lamellae around two axes would not be possible. In the above-described embodiment of the invention, the pivot pin is adjustable in the guide slot for the purpose of adjustment of the shutter, that is, the aperture opening. In contrast to the previously known constructions, there is provided only the change that the above-mentioned slot which is provided in any case, is somewhat increased in size and the pivot pins are movable through movement of the adustment apparatus.

The use of the invention is particularly effective in a shutter in which the lamellae operating apparatus, preferably annularly guided, contains a guide slot of shape corresponding to a desired shutter operating pattern in which the drive lever engages with a suitable drive pin. In this type of means for driving the lamellae operating apparatus, which can be built very simply, there exists no possibility of inserting a structural element between the drive lever and the lamella driving means which would make possible an alteration of the width of opening of the shutter lamella.

In further embodiments of the invention, the guide slot can be formed in such a manner that the lamellae driving means, upon pivoting of the drive lever in a single pivotal direction between a tensioning position and a release position, brings about an oscillating movement effecting the entire opening and closing operation of the shutter. Said guide slot can be further so formed that the drive pin has a sloped surface by means of which it escapes from the guide slot upon backward pivoting of the drive lever out of the release into the tensioning position. In this manner, extremely short shutter times are obtained since a movement of the drive lever in a single pivoted direction brings about back and forth movements of the lamellae operating means one movement following immediately and automatically after the other. In this manner the entire shutter operation takes effect by a spring, namely, the spring driving the drive lever. This makes it possible to better accommodate the apparatus for the different moment of inertia which develop in connection with different shutter openings than can be done when the opening and closing of the shutter utilize two different springs.

An example of the invention is shown in the illustration. It shows:

FIGURE 1, a schematic view of a diaphragm shutter embodying the invention in closed position.

FIGURE 2, a view of the shutter as in FIGURE 1 with the shutter in its mid-position and with a differently adjusted aperture.

FIGURE 3, a detail diaphragm shutter similar to FIGURES 1 and 2 in a sectional drawing corresponding to cutting line III—III in FIGURE 1.

In the illustration, 1 is a base plate of a diaphragm shutter embodying the invention. The base plate has a central outlet 2 for the light, which is surrounded by an upstanding ring flange 3. Shutter lamellae 4 are arranged under the base plate 1. The shutter lamellae 4 are moved by a lamella operating ring 5, which is pivoted for movement around the ring flange 3. The lamella operating ring 5 is connected with each shutter lamella 4 through the hinge pins 6. The hinge pins 6 project through oblong holes 7 in the base plate 1. The shutter lamellae 4 are pivotable around pivot pins 8, which are located in circular shaped slots 9 of the shutter lamellae 4. The pivot pins 8 are carried by links 10. The links are pivotable around axes 11, which are fastened to the base plate 1. The links 10 have stops between the pivot pins 8 and the axes 11. The stops are held in position by springs 13 to a diaphragm adjusting cam 14 which is rotatable relative to the base plate 1.

A drive lever 15 is used to oscillate the lamella operating ring 5. The drive lever 15 is mounted pivotally on an axis 16 on the base plate 1. The tension spring 17 is attached on one side to the lever 15, and on the other side to the base plate 1. The lever 15 has an arm 15A projecting out from the shutter housing which serves as a cocking lever.

The drive lever 15 carries a drive pin 18 which engages the lamellae operating ring 5 in a guide slot 19. The guide slot 19 is so formed that the lamellae operating ring 5 oscillates from the tension position (FIGURE 1, solid line) to the final position (same figure, broken lines) when the drive lever 15 is moved. This corresponds to one complete opening and closing operation of the shutter.

To return the lever from its end position into its tensioned position without opening the shutter, the drive pin 18 is provided at its lower end with a sloped portion 18A which slides back to the tensioned position over the portion of the lamellae operating ring 5A which is adjacent the guide slot 19. Such sliding movement is facilitated by the sloped portion 19A at the edge of the guide slot 19.

A release lever 20 is used to keep the lamellae operating ring 5 in the tensioned position. Said release lever 20 is mounted on the base plate 1 for pivotal movement around an axis 21 and is tensioned through a spring 22. The release lever 20 forms a hook 24 which in the tension position is held in a mouth 25 of the lamellae operating ring and prevents rotation of same.

The manner of operating of the diaphragm shutter follows:

When the release lever 20 is moved in a clockwise direction as shown in FIGURE 1, the hook 24 releases the lamellae operating ring 5. The tension spring 17 can rotate the drive lever 15 in a counterclockwise direction so that the drive pin 18 moves along the guide slot 19. Because of its shape, the lamellae operating ring is rotated first in a clockwise direction and then in a counterclockwise direction. In the first part of the described movement the link pins 6 are pivoted in a clockwise direction so that the shutter lamellae 4 also move in a clockwise direction from the pivot pins 8 and the opening 2 is entirely or partially opened depending upon the setting of the apparatus. This position is shown in FIGURE 2.

In the latter part of the movement above described, the drive pin 18 rotates the lamellae driving ring in the return direction in the guide slot 19 whereby the lamellae 4 again occupy the position shown in FIGURE 1.

At the same time the hook 24 of the release lever returns into the mouth 25 of the lamellae operating ring.

In order to again cock the shutter, the cocking lever 15A is pivoted in a clockwise direction so that the drive pin 18 by means of the sloped surface 18A moves out of the guide slot 19 and slides over the part 5A of the lamellae operating ring. In the tensioned position, the cocking lever enters again into the guide slot 19 and remains in such position inasmuch as the hook 24 prevents pivotal movement of the ring. With the pivots 8 occupying the position in the slot 9 of the shutter lamellae 4 shown in FIGURE 1, there is provided the relatively greatest spacing between the pivot pins 8 and the driving pins 6 and this in turn brings about the smallest possible shutter and aperture openings. In order to increase the size of such openings the diaphragm adjusting cam 14 is rotated in a counterclockwise direction, either by hand or through automatic mechanism neither of which are shown. Thus, the links 10 are moved through the action of the stops 12 and the pivot pins 8 are urged in the slots 9 in the direction of the hinge pins 6. Therefore, the distance between the hinge pins 6 and the pivot pins 8 becomes less so that the path of movement of the shutter lamellae 4 in consequence of the back and forth rotation of the lemella operating ring 5 is increased. By means of the iris-adjusting cam 14, the iris opening is adjusted as desired. It is apparent from FIGURE 2 that the pivot pins 8 in the position shown in FIGURE 1 are adjusted for the maximum aperture opening.

Inasmuch as the shutter lamellae 4 lie below the base plate 1 and the links 10 together with the pivot pins 8 lie above said base plate is provided with an opening 26 by which the pivot pins 8 can extend therethrough.

As apparent from the above description and drawings only the moment of inertia of each lamella 4 around the corresponding pivot pins is changed while changing the aperture. All other movable parts in the system remain unchanged. In this manner there is provided a predetermined relationship between the aperture opening and the shutter speed, whereby the longer the shutter speed the larger the aperture opening.

The example is not limited to the illustrated example herein set forth. Particularly a larger number of shutter lamellae can be used if desired. Further it is conceivable that the link pins 6 can be made movable. The adjustment of the movable pins can also be carried out through other means than a cam. Automatic adjusting means are also possible within the scope of the invention. The combination of the drive means described above for the lamellae operating ring with the adjustment mechanism is, as above described, especially in mind and on principle, it would also be possible to use a different drive for the operating ring of the lamellae. Particularly, it would be possible to make the shutter as a self-tensioning shutter in which the drive lever 15 is either provided as a catapult lever, which is driven by any known further lever system, or in which the tensioning-and-release lever is mounted movably around the axis 16 from which the drive lever separates at the moment of release and with which it again automatically couples after completion of the shutter operation.

All the features shown in the drawings and described above including design features thereof are also in various combinations within the scope of the invention.

The embodiments of the invention in which an exclusive property or privilege is claimed is defined as follows:

1. Photographic diaphragm shutter in which the shutter lamellae are pivoted around pivot pins, located in spaced relationship to a driving link pin, by means of lamellae operating means driven by a drive lever and by means of a link pin connected and oscillatable with said lamellae for opening and closing of the shutter wherein the lamella opening width is alterable, characterized in that for the altering of the aperture determined by the shutter lamellae, the spacing between the pivot pin and the link pin of each shutter lamellae is changed through changing of one of the two pins in a slot of the lamella by means of appropriate adjustment apparatus.

2. Diaphragm shutter according to claim 1 characterized in that the pivot pin of each shutter lamella is adjustable.

3. Diaphragm shutter according to claim 1 characterized in that the pivot pin of each shutter lamella is connected to a pivotally mounted link and through a spring engaging such link is held in contact with an adjustment cam provided on the adjustment apparatus.

4. Diaphragm shutter according to claim 1 in which the pivot pin of each shutter lamella is guided in a slot in the lamella characterized in that the pivot pin is movable in the slot.

5. Diaphragm shutter according to claim 1 characterized in that an appropriate circularly guided lamella operating means contains a guide slot shaped in a manner corresponding to a desired shutter opening pattern and in which the drive lever engages with a drive pin.

6. Diaphragm shutter according to claim 5 characterized in that the guide slot is formed in such a manner that the lamella operating means, upon pivoting of the drive lever in one pivotal direction between a tension position and a termination position, carries out a complete oscillation movement corresponding to one opening and closing of the shutter and further so formed that the drive pin has a sloped surface by means of which it escapes from the guide slot upon return pivoting of the drive lever from the termination position to the tensioned position.

References Cited by the Examiner

UNITED STATES PATENTS 3,208,366   9/1965   Schulz _____ 95—63

JOHN M. HORAN, *Primary Examiner.*